No. 787,638. PATENTED APR. 18, 1905.
J. PROEGER.
DRAWING APPARATUS FOR GLASS TANK FURNACES.
APPLICATION FILED APR. 13, 1904.
2 SHEETS—SHEET 2.
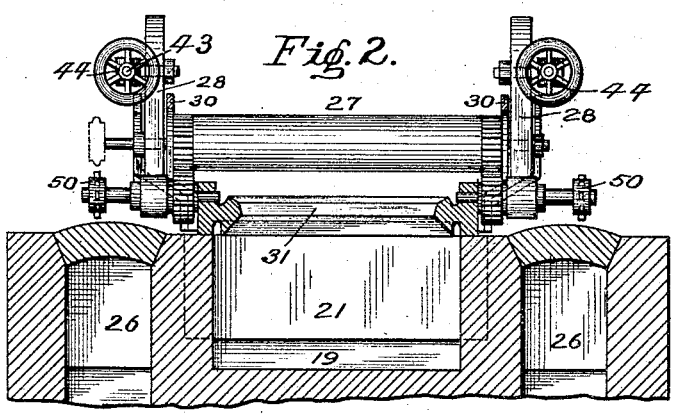
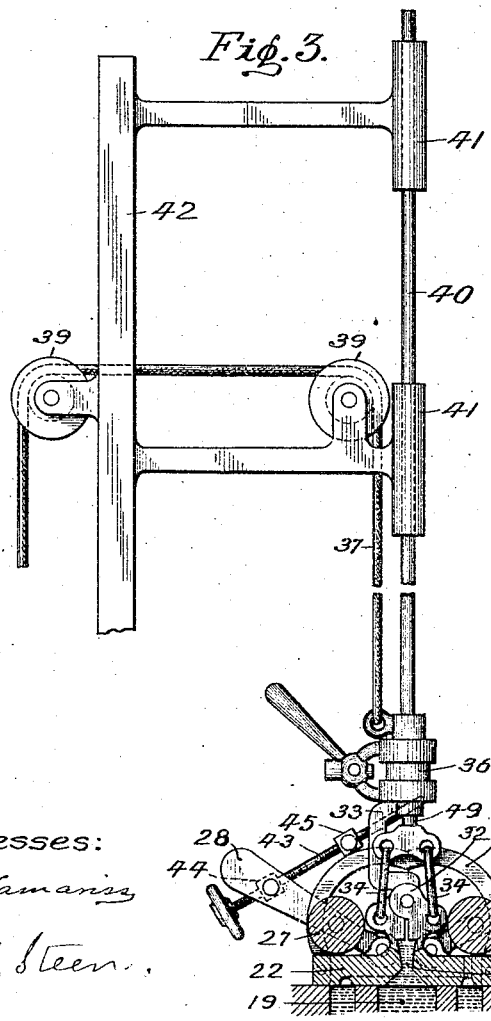
Witnesses:
Walter Jamariss
A. M. Steen.
Inventor:
Julius Proeger
by James K. Bakewell
his Attorney.

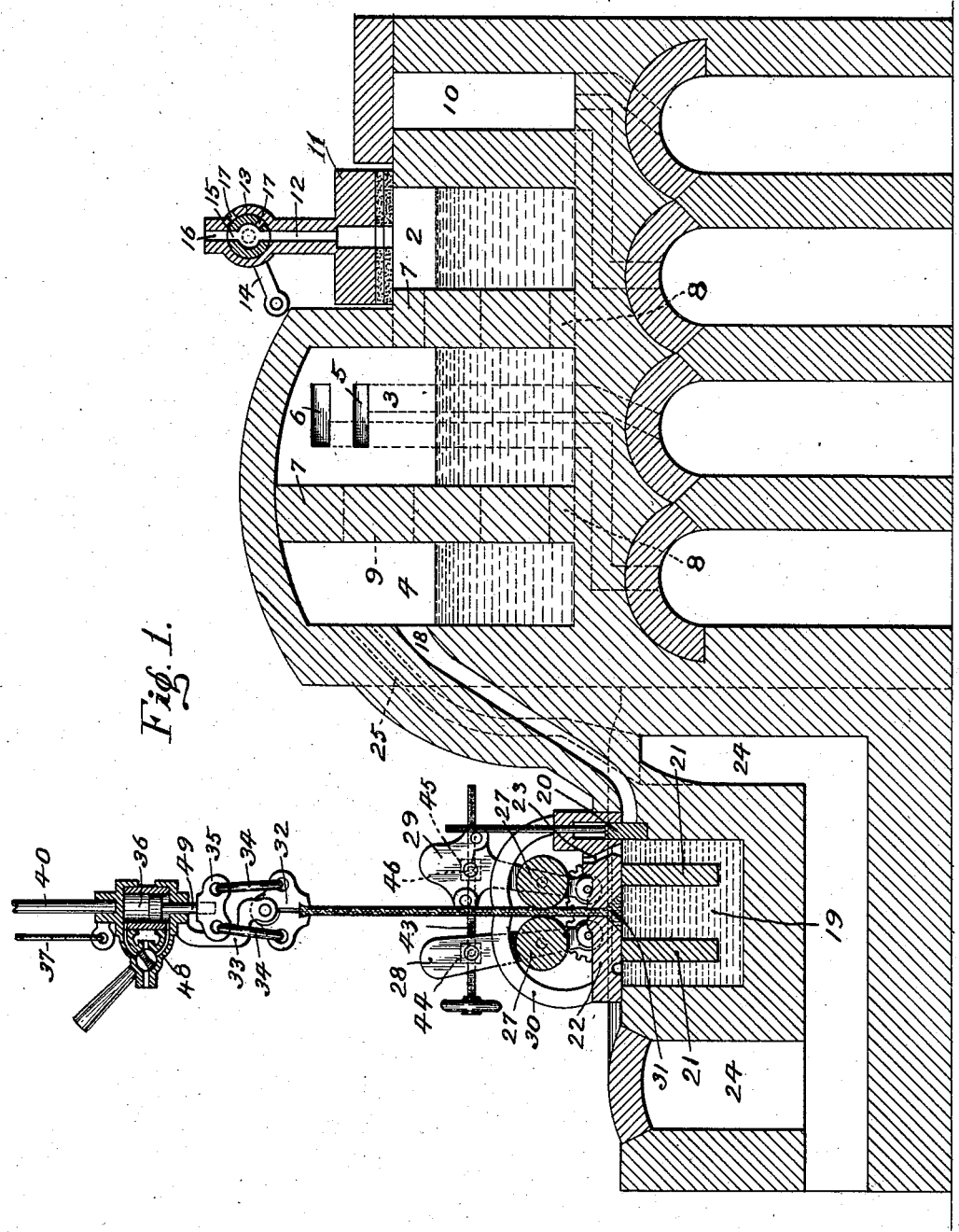

No. 787,638. Patented April 18, 1905.

UNITED STATES PATENT OFFICE.

JULIUS PROEGER, OF PITTSBURG, PENNSYLVANIA.

DRAWING APPARATUS FOR GLASS-TANK FURNACES.

SPECIFICATION forming part of Letters Patent No. 787,638, dated April 18, 1905.

Application filed April 13, 1904. Serial No. 202,934.

*To all whom it may concern:*

Be it known that I, JULIUS PROEGER, of the city of Pittsburg, in the county of Allegheny and State of Pennsylvania, have invented a certain new and useful Improvement in Drawing Apparatus for Glass-Tank Furnaces, of which the following is a full, clear, and exact description, reference being had to the accompanying drawings, forming part of this specification, in which—

Figure 1 is a vertical sectional view. Fig. 2 is a detached view of the pressing-rolls, showing the drawing-tank in vertical section; and Fig. 3 is an elevation of the drawing apparatus, showing the rolls and a portion of the tank in vertical section.

Like symbols of reference indicate like parts wherever they occur.

My invention relates to an improvement in glass-tank furnaces and drawing devices; and it consists in a furnace having a drawing-chamber and drawing devices for drawing the glass.

I will now describe my invention, so that others skilled in the art may manufacture and use the same.

I have shown the glass-furnace having a melting-chamber 3, a displacement-chamber 2, and a delivery-chamber 4, which are heated by means of the gas and air flues 5 and 6 or by any other suitable means, whereby the batch may be reduced to and retained in a molten condition. These chambers are separated from each other by partition-walls 7, and they communicate with each other by means of the passages 8 at the lower portion of the partition, these passages being shown by dotted lines. Thus the molten glass may flow freely from one chamber to the other. The air and gas flues 5 and 6 open into the upper portion of the melting-chamber 3, and this chamber 3 communicates with the chamber 4 by a flue or passage 9 above the normal level of the molten glass in the furnace. The chamber 2 does not communicate at its upper part with either the chamber 3 or 4, but is heated by the surrounding flue 10. Above the chamber 2 is a cover 11, having a fluid-pressure passage 12, provided with a valve 13, which valve has an operating-lever 14 and ports 15, which communicate with the passage leading into the chamber 2 and with a passage 16, leading to a supply of superheated steam or other fluid-pressure. The valve is also provided with ports 17, by means of which the passage 12 may be brought in communication with the atmosphere. Leading from the chamber 4 at a point above the normal level of the molten glass is a delivery-passage 18, which leads into the drawing-tank 19, situate on a lower level than the bottom of the chambers or tanks 2, 3, and 4.

At the bottom of the delivery-passage 18 is a gate 20, by means of which communication between the passage 18 and the tank 19 may be opened and closed. Extending downwardly in the tank 19 and longitudinally from one end to the other of the same are two wings 21 21, which extend nearly to the bottom of the tank, dividing it into three compartments or chambers communicating with each other at the bottom. This drawing-tank 19 is covered by an air-tight cover 22, to which the wings 21 may be attached. Passing through the cover 22 and leading into the outer compartments of the tank 19 is a fluid-pressure passage 23, which is connected with a suitable source of supply of fluid-pressure. Surrounding the drawing-tank 19 are heating-flues 24, the purpose of which is to keep the glass in the drawing-tank at the proper temperature and to prevent the cooling of the same. Leading from the flue 24 to the upper portion of the chamber 4 are flues 25, which flues pass through the walls of the furnace on both sides of the delivery-passage 18 and serve to heat the same. At the two ends of the drawing-tank 19 are heating-chambers 26. The purpose of these flues and heating-chambers, as already stated, is to keep the glass in the passage 18 and tank 19 in fluid condition. This furnace forms the subject-matter of another application, Serial No. 190,949.

Mounted in the cover 22 of the tank 19 are the pressing-rolls 27, between which the plate of glass is drawn from the glass in the tank 19. These rolls are mounted in the movable housings 28 29, (shown in Figs. 1 and 4,)

which housings are pivoted to the cover 22 and are supported by the double yokes 30 at each end of the rolls. In the cover 22 between the housings 28 and 29 is a longitudinal slot 31, through which the glass is drawn up between the rolls 27, the rolls serving to press the glass to the desired thickness and also to aid by their rotation in drawing the glass from the tank 19.

Although I may employ any bait or other suitable device in drawing the glass from the tank 9, I prefer to use the apparatus shown in Figs. 1 and 3 of the drawings. This drawing device consists of a two-part mold 32, which mold is of equal length with the slot 31 and the parts of which are pivoted to each other. The cavity of this mold is dovetailed in shape and open at the bottom, so that when the two parts of the mold are closed upon the molten glass a dovetail of the same will be retained in the cavity of the mold, the web of the glass extending through the opening in the base of the same. The mold is suspended from a hanger by means of the arm 33, and the two parts of the mold are provided with links 34, which are pivotally connected with the parts of the mold and also with the head 35 of the hydraulic or pneumatic plunger 49, which is adapted to travel in the cylinder 36. This hanger is suspended by the cord 37, passing over the sheaves 39 to a suitable hoisting and lowering apparatus. Extending from the cylinder 36 is a guide-rod 40, adapted to slide in supports 41, secured to the frame 42, so that as the hanger is raised and lowered the rod 40 will move freely up and down.

In order to introduce the molten glass from the drawing-tank 19 into the drawing-mold, it is necessary that the mold or drawer be brought directly over the slot 31 in the cover 22, and in order to do this it is necessary to move the rolls 27. This is readily accomplished by means of the pivoted housings 28 and 29, which housings are connected one with the other by means of the threaded bar 43, which passes through a pivoted nut 44, fixed in the housing 28, and a nut 45, which is adapted to be inserted in the pivotal cavity 46 in the housing 29, the housing being formed in two separable parts, pivoted to each other and adapted to close on the nut 45 and to be secured about the same by means of a securing-pin which fits in the eyes 47, so that when it is desired to bring the drawing-mold 32 over the longitudinal slot 31 the pin in the eyes 47 is withdrawn, allowing the two parts of the housing 29 to be separated to release the nut 45, whereupon the two housings and the rolls carried thereby may be thrown apart, permitting the drawing-mold 32 to be brought directly over and in contact with the side of the slot 31.

In order to fill the drawing-tank 19 with molten glass, fluid-pressure is allowed to pass through the conduit 12 into the upper portion of the displacement-chamber 2. The fluid-pressure upon the surface of the glass in the chamber 2 forces the glass from the chamber 2 through the passage 8 into the chambers 3 and 4 until the level of the glass is above the level of the opening of the passage 18, whereupon the molten glass by the force of gravity flows through the passage 18 into the drawing-tank 19, the gate 20 being open. When the drawing-tank 19 is filled, the gate 20 is closed. At the same time fluid-pressure is shut off from the chamber 2 by movement of the valve-lever 14. In order to cause the glass to pass from the drawing-tank 19 into the cavity of the mold 32, fluid-pressure is allowed to pass through the passage 23 in the cover 22, and this fluid-pressure bearing on the surface of the glass in the side portions of the tank 19 causes the glass to rise in the central portion of this tank between the wings 21, through the slot 31, and into the cavity of the mold 32. When the cavity of the mold is filled in this manner, the mold is raised by means of the cord 37, drawing the sheet of glass with it from the tank 19. As soon as the mold 32 has been elevated above the level of the rolls 27 the housings 28 and 29 are brought together, and the space between the rolls is regulated, by means of the threaded bar 43, to the required thickness of the glass to be drawn. The mold 32 is then drawn upward by means of the cord 37, drawing with it between the rolls 27 the sheet of glass. When it is desired to release the sheet of glass from the mold 32, fluid-pressure is admitted to the cylinder 36 below the plunger 49 through the valve 48, which causes the plunger to rise, and by means of the links 34 opens the two parts of the mold, releasing the sheet of glass therefrom.

In order to aid in drawing the glass from the tank 19, the rolls 27 are driven by means of the sprocket-wheel 50, which may be connected with sprockets driven by any suitable power. These rolls 27 where it is desired to manufacture cathedral-glass or figured glass should have their surfaces figured accordingly. In the case of plain glass they may be used to aid in drawing the glass from the tank and to form a smooth surface thereon. I do not, however, desire to limit myself to the use of these rolls, as they may be, in the case of plain glass, dispensed with and the glass drawn from the tank solely from the drawing-mold 32. I have mentioned that these rolls serve to regulate the thickness of the glass, and while this is true, yet the thickness of the glass is not dependent upon the use of these rolls, as by regulating the speed of the drawing-mold 32 the different thicknesses of glass may be drawn through a slot which is of a standard width—that is to say, that by increasing the rapidity of the movement of the drawing-mold 32 to a degree greater than the rapidity of the flow of the glass through the slot 31 a sheet of less thickness than the width of the slot may be produced.

Where a thin sheet of glass is to be drawn through a narrow slot, fluid-pressure alone may be used to raise the glass to the slot, through which it is drawn by any suitable bait or drawing device. Owing to the construction and arrangement of the heating-flues, the glass as it is delivered to the drawing-tank or gathering-tank may be kept at all times at the proper consistency.

Where it is so desired, the fluid-pressure valve 13 may be operated by suitable devices intermittently—that is, pulsations of fluid-pressure may be delivered to the chamber 2, causing a regular intermittent flow of glass from the delivery-chamber 4 through the passage 18.

Although I have described the drawing-tank as adapted to draw a flat plate or sheet of glass, I do not desire to limit myself to this shape, as other forms may be drawn by changing the shape of the slot through which the glass passes.

Having thus described my invention, what I claim, and desire to secure by Letters Patent, is—

1. In a glass-furnace, the combination of a source of supply of molten glass, a drawing-chamber, passages leading from the source of supply to the drawing-chamber, a wing, or wings, situate in the drawing-chamber and dividing it into two or more compartments, said compartments communicating with each other below the normal level of the glass in said chamber, and fluid-pressure devices for causing the glass to rise in the compartment of the drawing or gathering tank; substantially as specified.

2. In a glass-furnace, the combination of a drawing-tank having one or more wings dividing said tank into compartments, a slot in the cover of said tank, above one of said compartments, an opening for fluid-pressure, leading into the tank, in another of said compartments, said compartments communicating with each other below the normal surface of the glass; substantially as specified.

3. In a glass-furnace, the combination of a drawing-chamber having a wing, or wings, dividing said chamber into compartments, said compartments communicating with each other at a point below the normal surface of the glass, a slot in the cover of said tank above one of said compartments, adjustable rolls situate above said slot, and a device for drawing the molten glass through the slot and between the rolls; substantially as specified.

4. In a glass-furnace, the combination of a drawing-tank having a slot in the cover of the same, a two-part drawing-mold adapted to be lowered to the mouth of the slot, rolls situate above said slot and mounted in swinging housings, said housings being adjustably connected with each other, the rolls being adapted to be separated to allow the passage of the drawing-mold; substantially as specified.

In testimony whereof I have hereunto set my hand.

JULIUS PROEGER.

Witnesses:
A. M. STEEN,
JAMES K. BAKEWELL.